United States Patent [19]

Shimada et al.

[11] Patent Number: 4,894,409

[45] Date of Patent: Jan. 16, 1990

[54] RUBBER COMPOSITION

[75] Inventors: Noboru Shimada, Yokkaichi; Iwakazu Hattori, Aichi; Mitsuhiko Sakakibara, Matsudo; Noboru Oshima, Suzuka; Tatsuro Hamada, Higashimurayama; Hiromi Fukuoka, Kodaira; Tatsuo Fujimaki, Higashimurayama, all of Japan

[73] Assignees: Japan Synthetic Rubber Co., Ltd.; Bridgestone Corporation, both of Tokyo, Japan

[21] Appl. No.: 218,797

[22] Filed: Jul. 14, 1988

[30] Foreign Application Priority Data

Jul. 17, 1987 [JP] Japan .................................. 62-179670

[51] Int. Cl.$^4$ ............................. C08F 4/00; C08J 3/34
[52] U.S. Cl. ..................................... 524/492; 525/244
[58] Field of Search ............... 525/236, 237, 244, 351, 525/370; 524/492

[56] References Cited

U.S. PATENT DOCUMENTS

| | | | |
|---|---|---|---|
| 4,550,142 | 10/1985 | Akita et al. | 525/236 |
| 4,555,547 | 11/1985 | Ueda et al. | 525/237 |
| 4,555,548 | 11/1985 | Ueda et al. | 525/237 |
| 4,614,771 | 9/1986 | Watanabe et al. | 525/351 |
| 4,616,069 | 10/1986 | Watanabe et al. | 525/370 |

*Primary Examiner*—John Kight
*Assistant Examiner*—Carlos Azpuru
*Attorney, Agent, or Firm*—Sughrue, Mion, Zinn, Macpeak & Seas

[57] ABSTRACT

A rubber composition comprising not less than 20% by weight of an amino group-containing diene based polymer in a rubber component, and 10 to 100 parts by weight of silica as a filler with respect to 100 parts by weight of the rubber component. The amino group-containing diene based polymer is obtained by polymerizing a monomer or copolymerizing the monomer in an organic solvent in the presence of at least one of an organic alkali metal and an organic alkaline earth metal.

13 Claims, No Drawings

RUBBER COMPOSITION

BACKGROUND OF THE INVENTION (1) Field of the Invention

The present invention relates to a silica-mixed rubber composition having improved fracture characteristic and wear resistance.

(2) Related Art Statement

Heretofore, in order to obtain high fracture strength in rubber compositions mixed with silica, it is a conventional practice to improve reinforcement of silica by chemically bonding silica to an elastomer through adding a great amount of a silane-coupling agent while the silica and the elastomer are being kneaded together.

However, such a conventional method has shortcomings in that a great amount of an expensive coupling agent must be mixed to obtain sufficient reinforcement and that the greatest possible care must be paid to the silane-coupling agent because its commercial products are unstable in air.

SUMMARY OF THE INVENTION

Having repeatedly strenuously made investigations to solve the above-mentioned shortcomings, the present inventors have discovered that amino group-containing containing diene based polymer which is obtained by polymerizing a monomer or copolymerizing monomers in an organic solvent in the presence of an organic alkali metal or an organic alkaline earth metal as an initiator has an excellent effect to reinforce silica.

That is, the rubber composition according to the present invention is characterized in that the rubber composition contains not less than 20% by weight (hereinafter referred to briefly as "%") of the amino group-containing diene based polymer in a rubber component and that 10 to 100 parts by weight (hereinafter referred to briefly as "parts") of silica as a filler is added with respect to 100 parts of the rubber component.

As the amino group-containing diene based polymer, mention may be made of (A) a copolymer obtained by random-copolymerizing or block-copolymerizing (1) a diene monomer with an amino group-containing unsaturated compound or (2) a diene monomer and a vinyl aromatic compound with an amino group-containing unsaturated compound, and (B) a polymer or copolymer obtained by polymerizing a diene monomer alone or random-copolymerizing or block-copolymerizing a diene monomer with a vinyl aromatic compound and then reacting polymerization-active terminals of the thus obtained diene-based polymer or copolymer with an amino group-containing unsaturated compound or other amino group-containing compound than the above, respectively.

These and other objects, features and advantages of the invention will be appreciated upon reading of the following description of the invention, with the understanding that some modifications, variations, and changes of the same could be made by the skilled person in the art to which the invention pertains without departing from the spirit of the invention or the scope of claims appended hereto.

DETAILED DESCRIPTION OF THE INVENTION

The present invention will be explained in more detail below.

In the present invention, as the rubber component, the amino group-containing diene based polymer may be used alone, or blended with another diene rubber. It is necessary that not less than 20% of the amino group-containing diene based polymer is contained in the rubber component. If it is less than 20%, an effect to improve reinforcement of silica is not recognized.

According to the present invention, a mixing amount of a silica as a filler blended into the rubber component containing the amino group-containing diene polymer is limited to 10 to 100 parts, preferably 30 to 80 parts, with respect to 100 parts of the rubber component. It the mixing amount of the silica filler is less than 10 parts, the silica-reinforcing effect is small. On the other hand, it is unfavorably more than 100 parts, because processability and fracture characteristic are poor.

In the present invention, diene monomers usable for the production of the amino group-containing diene based polymer include diene monomers which are living-polymerizable by using an organic alkali metal or an organic alkaline earth metal. For example, 1,3-butadiene, 2,3-dimethylbutadiene, isoprene, 1,3-pentadiene, and hexadiene are mentioned as conjugated diene monomers. Among them, 1,3-butadiene or isoprene are preferred from the standpoint of copolymerization readiness.

In the present invention, as the amino group-containing unsaturated compound to be block- or random-copolymerized with the above diene monomer, 2-N,N-diemthylaminostyrene, 4-N,N-dimethylaminostyrene, 2-N,N-dimethylaminomethyl-styrene, 4-N,N-dimethylaminomethyl-styrene, 2-N,N-bis(trimethylsilyl)aminostyrene, 4-N,N-bis-(trimethylsilyl)aminostyrene, 2-vinylpyridine, 4-vinylpyridine, 2-vinyl(N,N-diisopropylbenzamide), 4-vinyl(N,N-diisopropylbenzamide), N,N-dimethylaminoethylstyrene, and N,N-diethylaminoethylstyrene may be mentioned. The content of the amino group-containing compound in the above copolymer is preferably from 0.1 to 30%, more preferably 1 to 20%.

In the present invention, the amino group-containing diene based polymer may be obtained by polymerizing the above diene monomer alone or random-copolymerizing or block-copolymerizing the above diene monomer with an vinyl aromatic compound and then reacting polymerization-active terminals of the thus obtained polymer or copolymer with the above amino group-containing unsaturated compound or another amino group-containing compound.

As the above vinyl aromatic compound, styrene, o-methylstyrene, p-methylstyrene, α-methylstyrene, vinylnaphthalene, p-tert-butylstyrene, etc. may be used. Among them, styrene is preferred.

Next, as the above amino group-containing compound, an amino group-containing compound having, in its molecule,

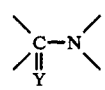

in which Y is an oxygen atom or a sulfur atom, and benzophenones and thiobenzophenones containing substituted amino groups may mainly be reacted. However, any amino group-containing compound may do so long as it reacts with the above polymerization-active terminals and adds to the polymer.

As specific examples, mention may be made of amides such as formamide, N,N-dimethylformamide, acetoamide, N,N-diethylacetoamide, aminoacetamide, N,N-dimethyl-N',N'-dimethylaminoacetoamide, N,N-dimethyl-aminoacetoamide, N,N-ethylaminoacetoamide, N,N-dimethyl-N'-ethylaminoacetoamide, acrylamide, N,N-dimethylacrylamide, N,N-dimethylmethacrylamide, nicotinamide, isonicotinamide, picolinic amide, N,N-dimethylisonicotinamide, succinic amide, phthalic amide, N,N,N',N'-tetramethylphthalic amide, oxamide, N,N,N',N'-tetramethyloxamide, 1,2-cyclohexanedicarboxylic amide, 2-furan carboxylic amide, N,N-dimethyl-2-furan carboxylic amide, quinole-2-carboxylic amide, and N-ethyl-N-methyl-quinoline carboxylic amide, imides such as succinic imide, N-methylsuccinic imide, maleimide, N-methylmaleimide, phthalimide, and N-methylphthalimide, lactam compounds such as ε-caprolactum, N-methyl-ε-caprolactum, 2-pyrrolidone, N-methyl-2-pyrrolidone, 2-piperidone, N-methyl-2-piperidone, 2-quinoline, and N-methyl-qunoline, urea compounds such as urea, N,N'-dimethylurea, N,N-diethylurea, N,N,N',N'-tetramethylurea, N,N-dimethyl-N',N'-diphenylurea, and N,N'-dimethylethylene urea, carbamic acid derivatives such as methyl carbamate, and methyl N,N-diethylcarbamate, isocyanuric acid derivatives such as isocyanuric acid, and N,N',N'-trimethylisocyanuric acid, thiocarbonyl-containing compounds corresponding thereto, 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-butyl-2-imidazolidinone, 1-methyl-3-(2-methoxyethyl)-2-imidazolidinone, 1-methyl-3-(2-ethoxyethyl)-2-imidazolidinone, 1,3-di-(2-ethoxyethyl)-2-imidazolidinone, 1,3-dimethylethylenethiourea, N,N'-diethylpropyreneurea, N-methyl-N'-ethylpropyreneurea, 1,3-dimethyl-3,4,5,6-tetrahydro-2-(1H)-pyrimidinone, 4,4'-bis(dimethylamino)benzophenone, 4,4'-bis(diethyl-amino)benzophenone, 4,4'-bis(diethylamino)thiobenzophenone, etc. These amino group-containing compounds may not only be singly used, but also two or more kinds of them may be used as a mixture.

The use amount of the amino group-containing compound to be reacted with active terminals of the diene based polymer is preferably in a range from 0.1 to 5.0 moles, more preferably from 0.2 to 20 moles, relative to 1 mole of the diene based polymer. If the use amount of the amino group-containing compound is less than 0.1 mole, rebound resilience and wear resistance are poor, and improvement due to the modification is not recognized. To the contrary, the use amount is unfavorably more than 50 moles from the economical standpoint, because an effect of improving physical properties is saturated. The above amino group-containing compound preferably exists at the terminals of the amino group-containing diene based polymer.

Particularly no limitation is posed upon the hydrocarbon solvent used in the present invention. For instance, n-pentane, n-hexane, cyclohexane, toluene, or n-heptane may be used. Among them, cyclohexane and n-hexane are particularly preferred. The above hydrocarbon solvents may not only be used singly, but also two or more kinds of them may be used as a mixture.

As the organic alkali metal used as the initiator in the present invention, alkyl lithium compounds such as reaction substances obtained by reacting n-butyllithium, sec-butylithium, t-butylithium, 1,4-dilithiobutane, or butylithium with divinyl benzene, alkylene dilithium, phenyl lithium, stylbendilithium, diisopropenylbenzene dilithium, sodium naphthalene, lithium naphthalene, and potassium naphthalene may be recited. These organic alkali metals may not only be used singly, but also two or more kinds of them may be used as a mixture.

Organic alkaline earth metals are also effective to the present invention as an initiator. For instance, n-butylmagnesium, n-hexylmagnesium, ethoxycalcium, potassium stearate, t-butoxystrontium, ethoxybarium, isopropoxybarium, t-butoxybarium, phenoxybarium, ethylmercaptobarium, diethylaminobarium, barium stearate, n-butyl barium, and 3,7-dimethyl-3-octoxybarium may be used. They may not only be used singly but also two or more kinds of them may be used as a mixture. As the case may be, the organic alkaline earth metals are preferably used in combination with the organic alkali metals.

Specifically, use may be made of polymerizing catalysts consisting essentially of $Ba[(t-C_4H_9O)_{1.8}(OH)_{0.2}]$, $(n-Bu)_2Mg$, and $Et_3Al$ disclosed in Japanese patent application Laid-open No. 56-118,403, polymerizing catalysts consisting essentially of diphenyl-1,6-pentadiene-1,4-one-3 barium, $Et_3Al$, and n-BuLi disclosed in Japanese patent publication No. 52-30,543, a polymerizing catalysts consisting essentially of a Ba compound disclosed in Japanese patent publications Nos. 52-48,910, 56-45,401, 60-2,323, 57-34,843, 59-17,724, and 60-26,406, and Japanese patent application Laid-open No. 56-112,916.

In the present invention, with respect to microstructures of a random-polymerizing agent for the aromatic vinyl compound and the diene portion of the diene based copolymer, the content of vinyl bonds can arbitrarily be varied depending upon uses by adding a Lewis base such as dimethoxybenzene, an ether such as tetrahydrofuran, dimethoxyethane, ethylene glycol dibutyl ether, diethylene glycol dibutyl ether, or diethylene glycol dimethyl ether, a tertial amine such as triethylamine, pyridine, N-methylmorpholine, N,N,N',N'-tetramethylethylenediamine, or 1,2-dipyperidinoethane to the polymer.

The copolymerization reaction in the presence of an organic alkali metal and/or an organic alkaline metal as an initiator and the reaction between polymerization-active terminals and an amino group-containing compound after the copolymerization are both effected in a temperature range from −80° to 120° C. under a constant temperature condition or a temperature-elevating or adiabatic condition. As the polymerization system, both batch polymerization and continuous polymerization may be used.

The amino group-containing diene based polymer according to the present invention includes polymers in which amino groups are bonded to side chains such as vinyl groups or polymers having a uniform or continuously changing composition along molecular chains of aromatic vinyl derivatives, or block copolymer.

The Mooney Viscosity ($ML_{1+4, 100° C.}$) of the amino group-containing diene based polymer according to the present invention is preferably in a range from 10 to 150. If it is less than 10, tensile strength is unfavorably poor, while if it is more than 150, processability undesirably drops.

The amino group-containing diene based polymer according to the present invention may be used in a blended state with one or more kinds of rubbers selected from natural rubber, high cis polyisoprene, emulsion-polymerized styrene-butadiene copolymer, solution-polymerized styrene-butadiene copolymer, high cis polybutadiene obtained by using neodium, nickel, cobalt, or titanium catalyst, ethylene-propyrene-diene terpolymer, and halogenated isobutylene-isoprene rubber. If necessary, an oil extender such as naphthenic process oil, and other various compounding ingredients, a vulcanizer, etc. may appropriately be blended. Further, a reinforcement such as carbon black may be blended.

The present invention will be explained in more detail with reference to the following Examples, but the invention should not be interpreted to limit the Examples so long as the gist of the invention is not lost.

Various measurements were made in the Examples according to the following ways.

The microstructure of the butadiene portion (the content of vinyl bonds) was measured according to the infrared method (Morero method). The content of styrene was measured according to a calibration curve predetermined by the infrared method based on absorption due to phenyl groups at 699 cm$^{-1}$. The amount of the amino group-containing unsaturated compound used in the copolymerization was measured based on a calibration curve predetermined by the FT-IR method.

Mooney viscosity was measured under conditions of 1 minute in preheating, 4 minutes in measuring time, and measuring temperature of 100° C.

The tensile strength was measured according to JIS K 6301. The Lambourn Index representing wear resistance was measured by Lambourn abrasion testing method. The measuring conditions were an applied load of 4.5 kg, a grinding stone surface speed of 100 m/sec, test piece speed of 130 m/sec, slipping percentage of 30%, an amount of dropped sand of 20 mg/min, and room temperature in measurement. The greater figures, the more excellent the wear resistance.

Polymers A~G

A dried 5-liter inner volume autoclave equipped with a stirrer and a jacket was replaced with nitrogen, and 2,500 g of preliminarily dried cyclohexane, a monomer or monomers, and tetrahydrofuran were charged thereinto according to a recipe shown in Table 1. Then, after 0.28 g of n-butyllithium was added, the mixture was adiabatically polymerized at 20° to 90° C. After the degree of polymerization conversion reached 100%, methanol was added to and reacted with the reaction mixture in an amount equal in equivalent to that of the n-buthyllithium. After 0.7 g of di-tert-butyl-o-cresol was added as an antioxidant with respect to 100 g of a rubber component, and desolvation drying was effected by an ordinary method. Physical properties of thus obtained polymers were measured, and results are shown in Table 3.

Polymers H~M

A dried 5-liter inner volume autoclave equipped with a stirrer and a jacket was replaced with nitrogen, and 2,500 g of preliminarily dried cyclohexane, a monomer or monomers, and tetrahydrofuran were charged thereinto according to the recipe shown in Table 2. Then, after 0.28 g of n-butyllithium was added, the mixture was adiabatically polymerized at 20° to 90° C. After the degree of polymerization conversion reached 100%, a polymerization terminal-modifier shown in Table 2 was added to and reacted with the reaction mixture. Then, 0.7 g of di-tert-butyl-p-cresol was added as an anti-oxidant relative to 100 g of a rubber component, and desolvation drying was effected by the ordinary method. Physical properties of thus obtained polymers or copolymers were measured, and results are shown in Table 4.

Examples 1~17

Each of Polymers B~C and E~M was kneaded according to a mixing recipe shown in Table 5, which was vulcanized at 145° C. for 30 minutes. Evaluated physical properties are shown in Table 6.

Comparative Examples 1~9

Each of polymers A, D, E, and F was kneaded according to the mixing recipe shown in Table 5, which was vulcanized at 145° C. for 30 minutes. Evaluated physical properties are shown in Table 7.

Example 18

By using 100 parts of Polymer G, 20 parts of silica, and 30 parts of carbon, vulcanization was effected according to the mixing recipe in Table 5. Strength was 218 kgf/cm$^2$ and wear resistance index was 126.

Example 19

The same autoclave as mentioned above was used, and 1,500 g of cyclohexane, 350 g of butadiene, 150 g of styrene, and 5 g of 4-dimethylaminostyrene were charged thereinto.

Next, a solution in which 4.1 mmol of dbutyl magnesium, 0.90 mmol of barium di-t-butoxide, and 0.93 mmol of triethy aluminum had preliminarily been reacted at 80° C. for 1 hour was added to the mixture, which was polymerized at 70° C. for 5 hours. The degree of conversion of the monomer was 84%. The Mooney viscosity of the thus obtained polymer was 53. The contents of trans bonds, vinyl bonds, cis bonds, and styrene were 82%, 6%, 12%, and 18%, respectively.

One hundred parts of the thus obtained polymer and 40 parts of silica were used, which was vulcanized according to the mixing recipe in Table 5. Strength was 225 kgf/cm$^2$ and wear resistance index was 141.

TABLE 1

| Polymer | Monomer (g) butadiene | styrene | amino group-containing unsaturated compound | | Tetrahydrofuran (g) |
| --- | --- | --- | --- | --- | --- |
| A | 500 | 0 | no | | 25 |
| B | 480 | 0 | dimethylamino-methylstyrenen | 20 | 25 |
| C | 480 | 0 | 4-dimethylamino-styrene | 20 | 25 |
| D | 400 | 100 | no | | 2 |
| E | 400 | 80 | 4-dimethylamino-methylstyrene | 20 | 2 |
| F | 400 | 80 | 4-dimethylamino-styrene | 20 | 2 |
| G | 400 | 80 | 2-vinylpyridine | 20 | 2 |

TABLE 2

| Polymer | Monomer (g) butadiene | Monomer (g) styrene | Tetrahydrofuran (g) | Amino group-containing compound (polymer terminal-molding agent) | Amino group-containing compound/active polymer terminal (equivalent ratio) |
|---|---|---|---|---|---|
| H | 500 | 0 | 25 | 2,N,N—bis(trimethylsilyl)aminostyrene | 3 |
| I | 500 | 0 | 25 | 1,3-dimethyl-2-imidazolidinone | 1 |
| J | 400 | 100 | 2 | 4,4'-bis-(dimethylamino)benzophenone | 1 |
| K | 400 | 100 | 2 | 4-dimethylaminostyrene | 5 |
| L | 400 | 100 | 2 | 4-dimethylaminomethylstyrene | 10 |
| M | 400 | 100 | 2 | 2-vinylpyridine | 3 |

TABLE 3

| Polymer | Styrene content (%) | Vinyl content (%) | Amino group-containing unsaturated compound (%) | Mooney viscosity |
|---|---|---|---|---|
| A | 0 | 68 | 0 | 40 |
| B | 0 | 67 | 4 | 42 |
| C | 0 | 67 | 4 | 41 |
| D | 20 | 29 | 0 | 40 |
| E | 16 | 29 | 4 | 42 |
| F | 16 | 30 | 4 | 40 |
| G | 16 | 30 | 4 | 41 |

TABLE 4

| Polymer | Styrene content (%) | Vinyl content (%) | Mooney viscosity |
|---|---|---|---|
| H | 0 | 68 | 40 |
| I | 0 | 68 | 43 |
| J | 20 | 30 | 41 |
| K | 20 | 30 | 42 |
| L | 20 | 29 | 40 |
| M | 20 | 30 | 41 |

TABLE 5

| Mixing recipe | |
|---|---|
| Polymer | A–M |
| Silica *1 | Tables 6 and 7 |
| Process oil *2 | 5 |
| Stearic acid | 2 |
| Antioxidant RD *3 | 1 |
| Zinc oxide | 3 |
| Vulcanization accelerator DPG *4 | 0.6 |
| Vulcanization accelerator DM *5 | 1.2 |
| Sulfur | 1.5 |

*1 NIPSIL VN3 (tradename) manufactured by Nippon Silica K.K.
*2 naphthenic oil
*3 polymerized trimethyldihalide quinoline
*4 1,3-diphenylguanidine
*5 benzothiazyldisulfide

TABLE 6

| | | Polymer composition polymer (parts by weight) | Polymer composition another polymer (parts by weight) | Silica (parts by weight) | Strength (kgf/cm²) | Wear resistance *1 |
|---|---|---|---|---|---|---|
| Example | 1 | B(100) | | 40 | 180 | 120 |
| | 2 | C(100) | | 40 | 185 | 125 |
| | 3 | E(100) | | 40 | 205 | 135 |
| | 4 | F(100) | | 40 | 208 | 136 |
| | 5 | G(100) | | 40 | 205 | 134 |
| | 6 | H(100) | | 40 | 170 | 125 |
| | 7 | I(100) | | 40 | 172 | 126 |
| | 8 | J(100) | | 40 | 203 | 131 |
| | 9 | K(100) | | 40 | 205 | 132 |
| | 10 | L(100) | | 40 | 200 | 125 |
| | 11 | M(100) | | 40 | 207 | 128 |
| | 12 | F(100) | | 20 | 130 | 103 |
| | 13 | F(100) | | 80 | 185 | 109 |
| | 14 | F(80) | #1500*2 (20) | 40 | 195 | 130 |
| | 15 | F(50) | #1500 (50) | 40 | 187 | 121 |
| | 16 | F(80) | natural rubber (20) | 40 | 220 | 128 |
| | 17 | K(50) | #1500 (50) | 40 | 185 | 120 |

*1 The larger values, the more excellent wear resistance (Results of Comparative Example 1 was taken as 100.)
*2 Emulsion-polymerized non-oil extended type SBR #1500 manufactured by Japan Synthetic Rubber Co., Ltd.

TABLE 7

|  | Polymer composition | | Silica (parts by weight) | Strength (kgf/cm²) | Wear resistance |
|---|---|---|---|---|---|
|  | polymer (parts by weight) | another polymer (parts by weight) |  |  |  |
| Comparative Example 1 | A(100) |  | 40 | 125 | 100 |
| 2 | D(100) |  | 40 | 153 | 105 |
| 3 | E(100) |  | 5 | 70 | 86 |
| 4 | D(80) | #1500 (20) | 40 | 135 | 102 |
| 5 | D(50) | #1500 (50) | 40 | 145 | 97 |
| 6 | D(80) | natural rubber (20) | 40 | 170 | 102 |
| 7 | F(10) | #1500 (90) | 40 | 158 | 102 |
| 8 | F(80) | #1500 (20) | 120 | 165 | 90 |
| 9 | F(80) | #1500 (20) | 5 | 70 | 85 |

As is evident from the above results, the rubber composition according to the present invention has more excellent fracture strength and wear resistance as compared with the conventional ones, and needs not expensive and handling-difficult silane-coupling agent. Thus, the rubber composition of the invention has excellent productivity and economy.

Therefore, the rubber composition according to the present invention has wide uses for such as tire treads, sidewalks, and industrial products.

What is claimed is:

1. A rubber composition comprising not less than 20% by weight of an amino group-containing diene based polymer in a rubber component, and 10 to 100 parts by weight of silica as a filler with respect to 100 parts by weight of the rubber component, said amino group-containing diene based polymer being obtained by polymerizing a monomer or copolymerizing said monomer in an organic solvent in the presence of at least one of an organic alkali metal and an organic alkaline earth metal.

2. The rubber composition according to claim 1, wherein said amino group-containing diene based polymer is obtained by copolymerizing a diene monomer with an amino group-containing unsaturated compound or copolymerizing the diene monomer with a vinyl aromatic compound and the amino group-containing unsaturated compound.

3. The rubber composition according to claim 1, wherein said amino group-containing diene based polymer is obtained by polymerizing a diene monomer alone or copolymerizing the diene monomer with a vinyl aromatic compound, and then reacting an amino group-containing unsaturated compound or another amino group-containing compound with polymerization-active terminals of the thus obtained diene based polymer or copolymer.

4. The rubber composition according to claim 1, wherein the silica filler is contained in an amount from 30 to 80 parts by weight with respect to 100 parts by weight of the rubber component.

5. The rubber composition according to claim 2, wherein the diene monomer is a monomer selected from the group consisting of 1,3-butadiene, 2,3-dimethylbutadiene, isoprene, 1,3-pentadiene, and hexadiene.

6. The rubber composition according to claim 2, wherein the amino group-containing unsaturated compound is a compound selected from the group consisting of 2-N,N-diemthylaminostyrene, 4-N,N-diomethylstyrene, 2-N,N-dimethylaminoethylstyrene, 4-N,N-dimethylaminoethylstyrene, 2-N,N-bis(trimethylsilyl)aminostyrene, 4-N,N-bis-(trimethylsilyl)aminostyrene, 2-vinylpyridine, 4-vinylpyridine, 2-vinyl(N,N-diisopropylbenzamide), 4-vinyl(N,N-diisopropylbenzamide), N,N-dimethylaminoethyl-styrene, and N,N-diethylaminoethylstyrene.

7. The rubber composition according to claim 2, wherein said vinyl aromatic compound is selected from the group consisting of styrene, o-methylstyrene, p-methylstyrene, α-methylstyrene, vinylnaphthalene, and p-tert-butylstyrene.

8. The rubber composition according to claim 3, wherein the amino group-containing compound is a compound selected from the group consisting of an amino group-containing compound having, in its molecule,

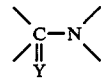

in which Y is an oxygen atom or a sulfur atom, and benzophenones and thiobenzophenones containing substituted amino groups.

9. The rubber composition according to claim 3, wherein the amino group-containing compound is a compound selected from the group consisting of formamide, N,N-dimethylformamide, acetoamide, N,N-diethylacetoamide, aminoacetamide, N,N-dimethyl-N',N'-dimethylaminoacetoamide, N,N-dimethylaminoacetoamide, N,N-ethylaminoacetoamide, N,N-dimethyl-N'-ethylamino-acetoamide, acrylamide, N,N-dimethylacrylamide, N,N-dimethylmethacrylamide, nicotinamide, isonicotinamide, picolinic amide, N,N-dimethylisonicotinamide, succinic amide, phthalic amide, N,N,N',N'-tetramethylphthalic amide, oxamide, N,N,N',N'-tetramethyloxamide, 1,2-cyclohexanedicarboxylic amide, 2-furan carboxylic amide, N,N-dimethyl-2-furan carboxylic amide, quinole-2-carboxylic amide, and N-ethyl-N-methyl-quinoline carboxylic amide, succinic imide, N-methylsuccinic imide, maleimide, N-methylmaleimide, phthalimide, N-methylphthalimide, ε-caprolactum, N-methyl-ε-caprolactum, 2-pyrrolidone, N-methyl-2-pyrrolidone, 2-piperidone, N-methyl-2-piperidone, 2-quinoline, N-methyl-qunoline, N,N'-dimethylurea, N,N-diethylurea, N,N,N',N'-tetramethylurea, N,N-dimethyl-N',N'-diphenylurea, methyl carbamate, methyl N,N-diethylcarbamate, isocyanuric acid, and N,N',N'-trimethylisocyanuric acid, thiocarbonyl-containing compounds corresponding thereto, 1,3-diethyl-2-imidazolidinone, 1,3-dimethyl-2-imidazolidinone, 1,1-dipropyl-2-imidazolidinone, 1-methyl-3-ethyl-2-imidazolidinone, 1-methyl-3-propyl-2-imidazolidinone, 1-methyl-3-butyl-2-imidazolidinone, 1-methyl-3-(2-methoxyethyl)-2-imidazolidinone, 1-methyl-3-(2ethoxyethyl)-2-imidazolidinone, 1,3-di-(2-ethoxyethyl)-2-imidazolidinone, 1,3-dimethylethylenethiourea, N,N'-diethylpropyreneurea, N-methyl-N'-ethylpropyreneurea, 1,3-dimethyl-3,4,5,6-tetrahydro-2-(1H)-pyrimidinone, 4,4'-bis(dimethylamino)benzophenone, 4,4'-bis(diethyl-amino)benzophenone and, 4,4'-bis(diethylamino)thiobenzophenone.

10. The rubber composition according to claim 1, wherein the organic alkali metal is an alkyl lithium compound substances obtained by reacting n-butylithium, sec-butyllithium, t-butyllithium, 1,4-dilithiobutane, or butyllithium with divinyl benzene, alkylene dilithium, phenyl lithium, stylbendilithium, diisoprepenylbenzene dilithium, sodium naphthalene, lithium naphthalene, and potassium naphthalene.

11. The rubber composition according to claim 1, wherein the organic alkaline earth metal is a compound selected from the group consisting of n-butylmagnesium, n-hexylmagnesium, ethoxycalcium, potassium stearate, t-butoxystrontium, ethoxybarium, isopropoxybarium, t-butoxybarium, phenoxybarium, ethylmercaptobarium, diethylaminobarium, barium stearate, n-butyl barium, and 3,7-dimethyl-3-octoxybarium.

12. The rubber composition according to claim 1, wherein the Mooney viscosity ($ML_{1+4, 100° C.}$) of the amino group-containing diene based polymer is in the range from 10 to 150.

13. The rubber composition according to claim 1, wherein the amino group-containing diene based polymer is used in a blended state with one or more kinds of rubbers selected from the group consisting essentially of natural rubber, high cis polyisoprene, emulsion-polymerized styrene-butadiene copolymer, solution-polymerized styrene-butadiene copolymer, high cis polybutadiene obtained by using neodium, nickel, cobalt, or titanium catalyst, ethylene-propyrene-diene terpolymer, and halogenated isobutylene-isoprene rubber.

* * * * *